Figure 1:
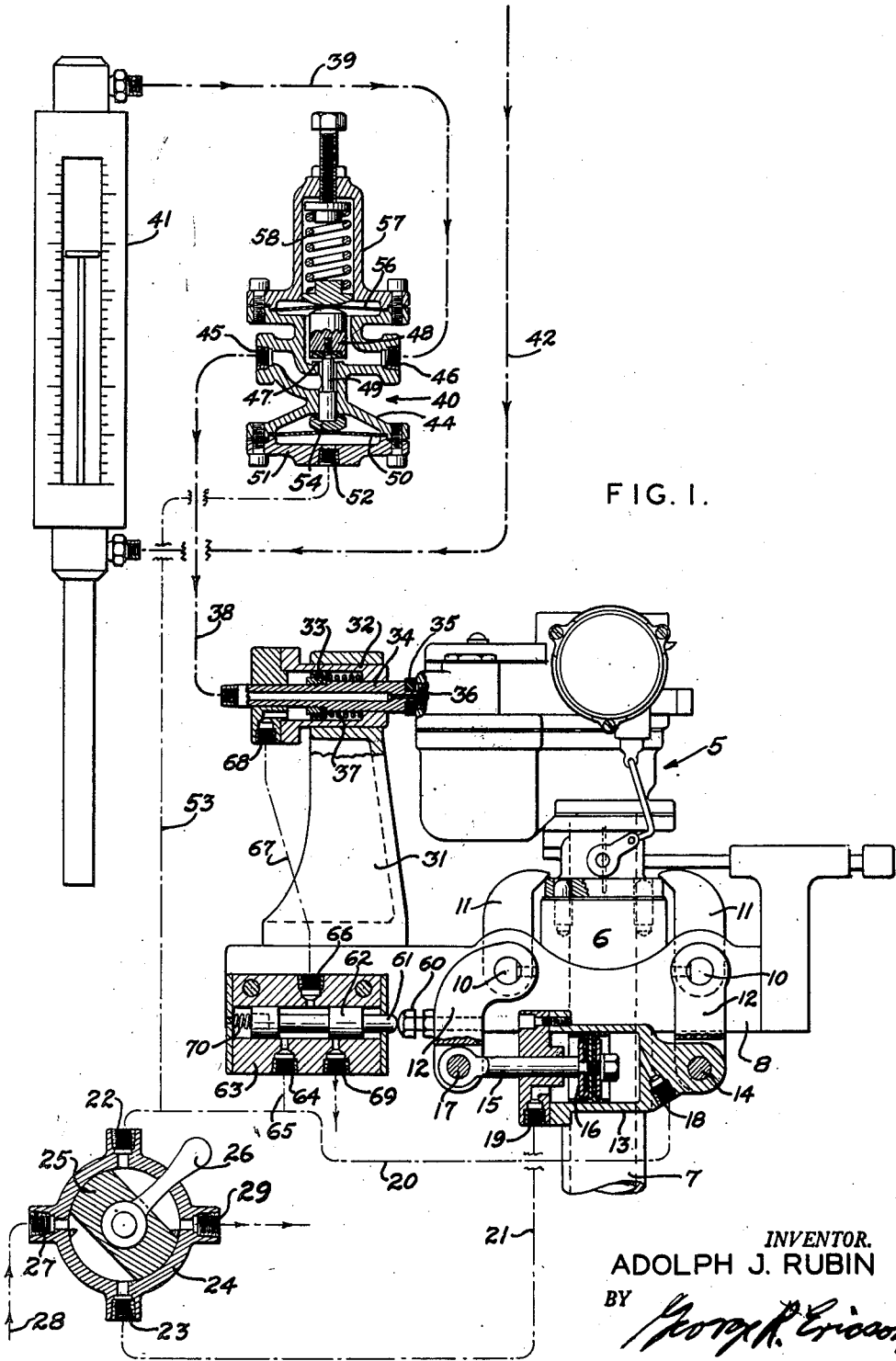

March 9, 1954

A. J. RUBIN 2,671,345

FLOW MACHINE FIXTURE

Filed May 3, 1950

2 Sheets-Sheet 1

INVENTOR.
ADOLPH J. RUBIN
BY
ATTORNEY

March 9, 1954
A. J. RUBIN
2,671,345
FLOW MACHINE FIXTURE
Filed May 3, 1950
2 Sheets-Sheet 2
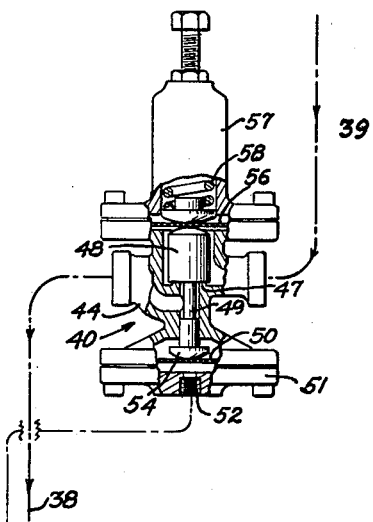
FIG. 2.
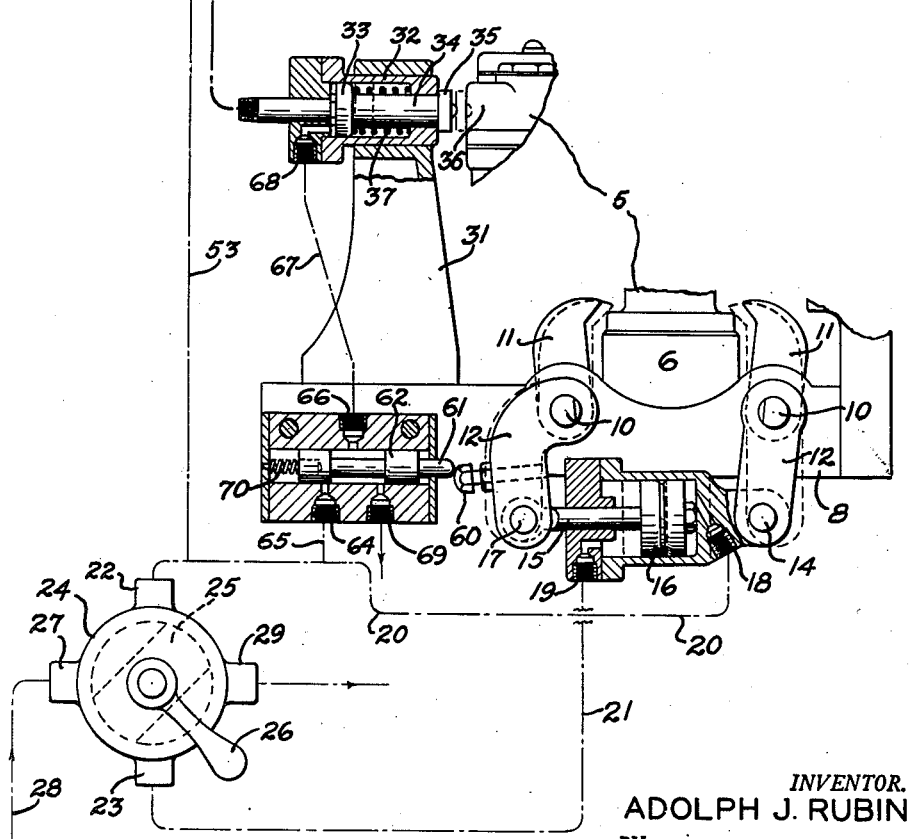
INVENTOR.
ADOLPH J. RUBIN
BY
ATTORNEY Patented Mar. 9, 1954

2,671,345

UNITED STATES PATENT OFFICE 2,671,345

FLOW MACHINE FIXTURE

Adolph J. Rubin, St. Louis, Mo., assignor to Carter Carburetor Corporation, St. Louis, Mo., a corporation of Delaware Application May 3, 1950, Serial No. 159,690

4 Claims. (Cl. 73—118)

This invention relates to flow test apparatus, for instruments such as carburetors, and consists particularly in a novel mounting and connection fixture for instruments to be tested.

When carburetors are flow tested on a high production basis, it is essential that means be provided for rapidly mounting the carburetors in test position and securing test connections thereto. Furthermore, the operations must be arranged so that the flow test operator may mount the carburetor for test, initiate the testing operation, cut off the flow of test fluid, and dismount the carburetor with a minimum of lost motion.

The main object of the present invention is to provide a test fixture for accomplishing the above objects.

This and other more detailed objects hereafter appearing are attained by the apparatus illustrated in the accompanying drawings in which Fig. 1 is a view showing various features of the fixture and test apparatus, portions being sectioned and other portions, particularly, the fluid connections, being shown diagrammatically.

Fig. 2 shows the clamping fixture and control devices in the "off" or retracted positioning thereof, "on" or test positioning of these parts being indicated in dotted lines.

Figure 1 shows a carburetor 5 mounted on a test stand 6 which may constitute part of a flow test apparatus such as that described and claimed in a co-pending application, Serial No. 156,912, filed April 19, 1950, in the name of James L. Edelen. A suction pipe 7 leads to a suitable suction pump for drawing air and fuel at measured rates through the carburetor.

The carburetor is secured to the stand or base by means of a clamp including a permanently mounted frame 8 having transversely mounted pins or shafts 10 pivotally mounting jaws 11 and actuating arms 12. Right hand arm 12 is pivotally connected to a cylinder 13 by means of a pin 14. Left hand arm 12 is pivotally connected to shaft 15 on a piston 16, working in cylinder 13, by means of a pin 17. Cylinder 13 has threaded fittings 18 and 19 for connection to compressed air ducts 20 and 21. These ducts lead to fittings 22 and 23 in a valve casing 24. Working in the valve casing is a divider 25 having an operating handle 26. A source of compressed air (not shown) is connected to valve fitting 27 by means of tubing 28. The fitting 29 provides for exhausting the fluid pressure.

An upright stand 31 on frame 8 adjacent base 6 mounts a cup 32 in which works a piston packing 33 formed on a hollow plunger 34 having a packing 35 at its terminal end for fluid tight connection to threaded fuel inlet boss 36 on the carburetor. Packing 33 is constantly urged to the left or retracted position by a coiled spring 37.

Hollow plunger 34 is connected by means of tubing 38 and 39, through test valve 40, to fuel flow meter 41 to which fuel from a source of supply not shown is led through tubing 42. Any suitable fuel flow meter may be used. Test valve 40 comprises an intermediate casing 44 having threaded fittings 45 and 46 for tubes 38 and 39, respectively. Between these fittings, there is a valve seat 47 controlled by a valve plunger 48 connected to an actuating stem 49 slidably guided for vertical motion within casing 44. A diaphragm 50 is mounted across the lower open face of casing 44 by means of a cap 51 having a threaded fitting 52 for connection to valve casing 24 by means of tubing 53. Actuator pin 49 has an enlargement 54 at its lower extremity bearing against diaphragm 50.

A second diaphragm 56 extends across the open upper face of intermediate valve casing 44 and is secured in position by a cap 57 hollowed to receive coiled compression spring 58 which normally urges diaphragm 56 and valve 48 downwardly so as to close the valve.

Left hand clamping arm 12 mounts an actuator extension 60 which bears against a projection 61 on a slide valve 62 working in a valve casing 63. This casing has a threaded fitting 64 connected by tubes 65 and 20 to control valve fitting 22. Casing 63 has a second threaded fitting 66 connected by tubing 67 to a threaded fitting 68 opening into the interior of cup 32 so as to apply fluid pressure to the right hand side of piston packing 33. A third threaded fitting 69 in valve casing 63 provides for exhaust. A coiled spring 70 constantly urges slide valve 62 to the right.

The flow test fixture and apparatus operates as follows:

Control lever 26, in Fig. 1, is shown in the "stop" position in which fluid pressure is exhausted from the pressure chamber beneath test valve diaphragm 50 so that valve 48 is closed cutting off the supply of test fluid through flow meter 41 and tubes 39 and 38 to plunger 34 and the carburetor. In this position of valve 25, fluid pressure is directed through tube 21 to the left hand side of piston 16 so as to draw pins 14 and 17 together and open clamping jaws 11, releasing the carburetor. This releasing movement of clamping levers 12 permits shifting of slide valve 62 to the right by means of coil compression spring 70 which connects cup 32 by means of tube 67 to exhaust fitting 69, permitting coiled compression spring 37 to retract plunger 34 disconnecting the fuel line from the carburetor. Another carburetor may then be placed in position whereupon control lever 26 will be rotated to its "start" position shown in Fig. 2.

This figure shows in solid lines clamping jaws 11 released, test fluid connecting plunger 34 retracted, and test valve 48 closed. Upon shifting of the control lever, as stated, fluid pressure is led simultaneously through tubes 20 and 53 to the right hand side of piston 16 and to the pressure chamber beneath diaphragm 50 in the test valve. The first action is the shifting of piston 16 to the left and consequent rotation of clamping jaws 11 to secure the carburetor in position for the ensuing test. Shifting of left hand clamping lever 12 moves slide valve 62 to the left to cut off exhaust fitting 69 and connect cup 32 to fluid pressure through tubes 67 and 65 and 20 and control valve fittings 22 and 27. This results in rightward movement of plunger 34 and connection thereby of test fluid line 38 to the carburetor.

After clamping piston 16 has been moved fully to its leftwardmost position, pressure is built up beneath diaphragm 50 sufficiently to counteract compression spring 58 and open test valve 48 permitting the flowing of test fluid to the carburetor. Thus, the sequence of operations is:

(1) The clamping of the carburetor in position,
(2) The connection of the test fluid line to the carburetor by means of shifting plunger 34, and
(3) Opening of test fuel valve 48. When control lever 26 is again shifted to its "stop" position, as in Fig. 1, after completion of the test, the sequence of operation is:

(1) Cutting off of test fuel valve 48.
(2) Releasing of the clamping jaws 11, and
(3) Retracting of test fluid line connecting plunger 34.

By means of the above described fixture and apparatus, the operator is able to place the carburetor in position with one hand and then, with the other hand, operate control valve 26 which completes the necessary operations for the test procedure. Thereafter, the fuel and air flows are measured on suitable scales and the tested carburetor either placed in line for packing and shipping or discarded, as determined by the test.

The exact construction of the clamp may be modified as may the other features and the exclusive use of all modifications as come within the scope of the appended claims is contemplated.

I claim:

1. A flow test fixture comprising a base, a clamp for securing an instrument to said base for testing, a conduit for leading test fluid to the instrument and having a shiftable terminal fitting, a test valve in said conduit, motors operatively connected, respectively, to said clamp, said fitting, and said valve, a control for each of said clamp and fitting motors, an operative connection between said clamp and said fitting motor control for causing energization of said fitting motor and connection of said fitting to the instrument upon clamping of the instrument to said base, and a second operative connection between said clamp motor control and said test valve motor including a delayed response instrumentality for causing delayed opening of said test valve upon a single movement of said clamp motor control whereby the instrument being tested is successively clamped in test position and connected to the test fluid and the fluid turned on upon a single movement of said control element.

2. A flow test fixture comprising a base, a clamp for securing an instrument to said base for testing, a conduit for leading test fluid to the instrument and having a shiftable terminal fitting, a test valve in said conduit, motors operatively connected, respectively, to said clamp, said fitting, and said test valve, a control for each of said motors, a connection from said control to said motors for operating said clamp and said fitting, means in said connection to said motor for operating said fitting for causing energization of said fitting motor and connection of said fitting to the instrument upon clamping of the instrument to said base, and a second operative connection between said first connection and said test valve motor including a device shiftable to a position, responsive to clamping movement of said clamp, to render said second operative connection effective to cause opening of said test valve upon actuation of said control whereby the instrument is successively clamped in test position and connected to the test fluid and the fluid turned on upon a single movement of said control.

3. A flow test fixture comprising a test base, a clamp for securing an instrument on said base, a conduit for leading test fluid to the instrument and having a shiftable terminal fitting, a test valve in said conduit, fluid motors operatively connected to said clamp and said valve, a manual control valve for said motors, a source of fluid pressure and ducts connecting said manual valve and said source to said motors, an actuating motor for said conduit fitting and a control therefor, an operating connection between said clamp and said fitting motor control for causing energization of said fitting motor and shifting of said fitting into connection with the instrument upon movement of said clamp into instrument securing position, said manual valve being arranged to simultaneously open or close said ducts so as to connect and disconnect said fluid pressure source and said clamp and valve motors, and means resiliently resisting opening of said test valve following the application of fluid pressure to said test valve motor whereby supply of the test fluid to the test instrument occurs only after clamping of the instrument and test positioning of said fitting.

4. A flow test fixture comprising a base, a clamp for movement to a closed position to secure an instrument on said base for testing, a conduit for leading fuel to the instrument, said conduit having a shiftable terminal fitting for connection to the instrument, a test valve in said conduit, individual fluid motors for operating said clamp, fitting, and valve, means resiliently resisting opening of said test valve, a source of fluid pressure, a fluid connection between said source and said fitting motor and a control valve in said connection, an operative connection between said clamp and said control valve for causing shifting of the latter, respectively, to connect and disconnect said source and said fitting motor as said clamp is closed and opened, a branched fluid pressure connection leading from said source to said clamp and test valve motors, and a manual valve in said last connection so that movement thereof to the "on" position simultaneously applies operating pressure to said clamp motor, tending to close said clamp, to said valve motor, tending to open said valve, and through said control valve to said fitting motor so as to shift said fitting into connection with the instrument after said clamp is closed, said resilient resisting means delaying action of said test valve until movements of said clamping and fitting motors have been arrested.

ADOLPH J. RUBIN.

References Cited in the file of this patent

UNITED STATES PATENTS

| Number | Name | Date |
| --- | --- | --- |
| 1,613,150 | Zore | Jan. 4, 1927 |
| 2,445,943 | Edelen | July 27, 1948 |
| 2,497,193 | Webb | Feb. 14, 1950 |